United States Patent
Shahparnia et al.

(10) Patent No.: US 10,613,643 B2
(45) Date of Patent: Apr. 7, 2020

(54) METHOD FOR STYLUS TOUCH-DOWN AND LIFT-OFF NOISE MITIGATION

(71) Applicant: Apple Inc., Cupertino, CA (US)

(72) Inventors: Shahrooz Shahparnia, Monte Sereno, CA (US); Vivek Pant, San Jose, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 14/751,057

(22) Filed: Jun. 25, 2015

(65) Prior Publication Data

US 2016/0378208 A1    Dec. 29, 2016

(51) Int. Cl.
| | |
|---|---|
| G09G 5/00 | (2006.01) |
| G06F 3/0354 | (2013.01) |
| G06F 3/041 | (2006.01) |
| G06F 3/038 | (2013.01) |

(52) U.S. Cl.
CPC ........ G06F 3/03545 (2013.01); G06F 3/0383 (2013.01); G06F 3/0418 (2013.01)

(58) Field of Classification Search
CPC .... G06F 3/044; G06F 3/03545; G06F 3/0412; G06F 3/0414; G06F 3/0418
USPC ........................................ 345/174, 179, 173
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2014/083563 A2 | 6/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jennifer T Nguyen
(74) *Attorney, Agent, or Firm* — Kubota & Basol LLP

(57) ABSTRACT

Active styli, methods and non-transitory computer readable storage media can be used for mitigating noise coupling from an active stylus to a touch sensing system. An active stylus can include a force sensor that can be used to detect stylus touch-down and lift-off events. Based on a touch-down and lift-off events, the stylus can generate stimulation signals and ramp up or ramp down the amplitude of the stimulation signals. Additionally or alternatively, an active stylus can receive information to synchronize the active stylus with a touch-sensitive device. Based on the information, the stylus can synchronize generation of stimulation signals with the stylus scan performed by the touch-sensitive device. The stimulation signals can be ramped up during a guard band period before a stylus scan and can be ramped down during a guard band period after the stylus scan.

13 Claims, 10 Drawing Sheets

(56) References Cited

U.S. PATENT DOCUMENTS

| | | |
|---|---|---|
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2005/0128191 A1* | 6/2005 | Katsurahira .......... G06F 1/3203 345/179 |
| 2006/0197753 A1 | 9/2006 | Hotelling |
| 2010/0170726 A1* | 7/2010 | Yeh .................... G06F 3/03545 178/19.03 |
| 2013/0106713 A1 | 5/2013 | Shahparnia et al. |
| 2013/0249823 A1* | 9/2013 | Ahn ....................... G06F 3/038 345/173 |
| 2013/0265273 A1* | 10/2013 | Marsden ............... G06F 3/0416 345/174 |
| 2014/0028634 A1* | 1/2014 | Krah ...................... G06F 3/041 345/179 |
| 2014/0028635 A1* | 1/2014 | Krah ...................... G06F 3/041 345/179 |
| 2014/0267071 A1 | 9/2014 | Shahparnia |
| 2014/0300376 A1 | 10/2014 | Philipp et al. |
| 2015/0116271 A1 | 4/2015 | Shahparnia et al. |
| 2015/0160782 A1* | 6/2015 | Park ...................... G06F 3/0418 345/174 |
| 2015/0193025 A1* | 7/2015 | Rebeschi ............ G06F 3/03545 345/174 |
| 2017/0003768 A1* | 1/2017 | Zhang .................... G06F 3/044 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

METHOD FOR STYLUS TOUCH-DOWN AND LIFT-OFF NOISE MITIGATION

FIELD

This relates generally to stylus input devices for use with touch-sensitive devices and, more specifically, to mitigating noise caused by the touch-down and lift-off of a stylus input device.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. However, using an active stylus can present demodulation challenges to the touch-sensitive device due to the interaction between the stylus and the touch-sensitive device.

SUMMARY

Various active styli, methods and non-transitory computer readable storage media can be used for mitigating noise coupling from an active stylus to a touch sensing system. An active stylus can include a force sensor that can be used to detect stylus touch-down and lift-off events. Based on a touch-down event, the stylus can begin generating stimulation signals and ramp up the amplitude of the stimulation signals to a desired amplitude level. Based on a lift-off event, the stylus can ramp down the amplitude of the stimulation signals and then stop generating stimulation signals. Alternatively, the stylus can continue generating stimulation signals at the desired amplitude level for a period of time after the lift-off event. After the period of time, the stylus can stop generating the stimulation signals without ramping down the amplitude of the stylus stimulation signals.

Additionally or alternatively, an active stylus can receive information from a touch-sensitive device to mitigate noise from stylus touch-down or lift-off. The information can include clock information to synchronize the active stylus with the touch-sensitive device and can include a scan plan indicative of the sequence of scans, including stylus scans, to be performed by the touch-sensitive device. Based on the information, the stylus can synchronize generation of stimulation signals with the stylus scan performed by the touch-sensitive device. The generation of stimulation signals can begin during a guard band period before a stylus scan and can end during a guard band period after the stylus scan. The stimulation signals can be ramped up when the stylus begins to generate stimulation signals and ramp down before the stylus stops generating stimulation signals. The guard band periods before and after the stylus scan can be reduced by ramping up and ramping down the stimulation signals.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to active styli, methods and non-transitory computer readable storage media that can be used for mitigating noise coupling from an active stylus to a touch sensing system. An active stylus can include a force sensor that can be used to detect stylus touch-down and lift-off events. Based on a touch-down event, the stylus can begin generating stimulation signals and ramp up the amplitude of the stimulation signals to a desired amplitude level. Based on a lift-off event, the stylus can ramp down the amplitude of the stimulation signals and then stop generating stimulation signals. Alternatively, the stylus can continue generating stimulation signals at the desired amplitude level for a period of time after the lift-off event. After the period of time, the stylus can stop generating the stimulation signals without ramping down the amplitude of the stylus stimulation signals.

Additionally or alternatively, an active stylus can receive information from a touch-sensitive device to mitigate noise from stylus touch-down or lift-off. The information can include clock information to synchronize the active stylus with the touch-sensitive device and can include a scan plan indicative of the sequence of scans, including stylus scans, to be performed by the touch-sensitive device. Based on the information, the stylus can synchronize generation of stimulation signals with the stylus scan performed by the touch-sensitive device. The generation of stimulation signals can begin during a guard band period before a stylus scan and can end during a guard band period after the stylus scan. The stimulation signals can be ramped up when the stylus begins to generate stimulation signals and ramp down before the stylus stops generating stimulation signals. The guard band periods before and after the stylus scan can be reduced (e.g., in duration) by ramping up and ramping down the stimulation signals.

Figure 1A:
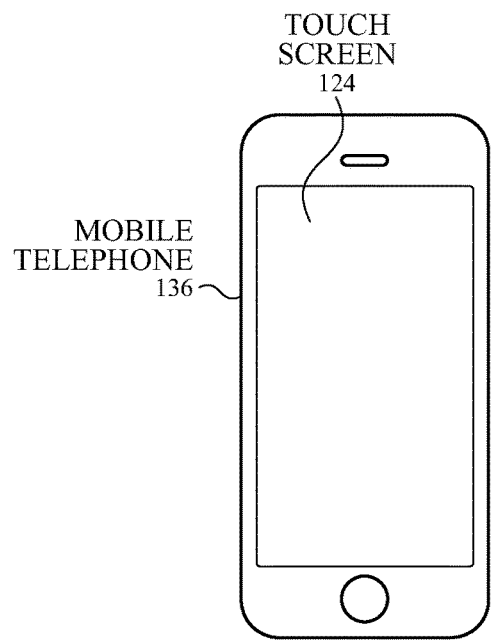
FIGS. 1A-1D illustrate examples of systems with touch screens that can accept input from an active stylus according to examples of the disclosure.
Figure 1B:
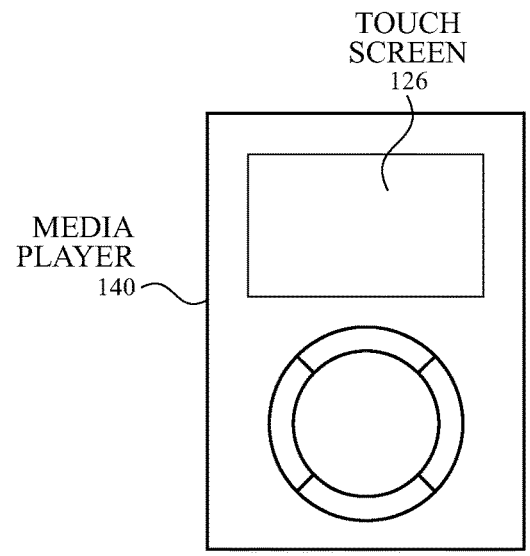
Figure 1C:
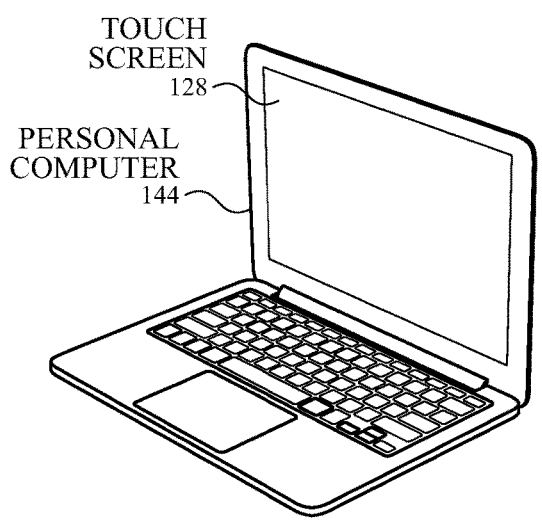
Figure 1D:
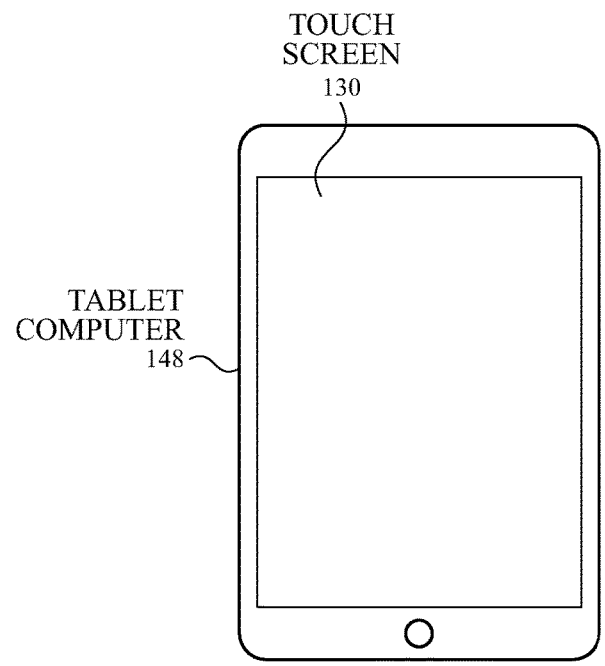

FIGS. 1A-1D illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. FIG. 1D illustrates an example tablet computing device 148 that includes a touch screen 130 that can accept input from an active stylus according to examples of the disclosure. Other devices, including wearable devices, can accept input from an active stylus according to examples of the disclosure.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
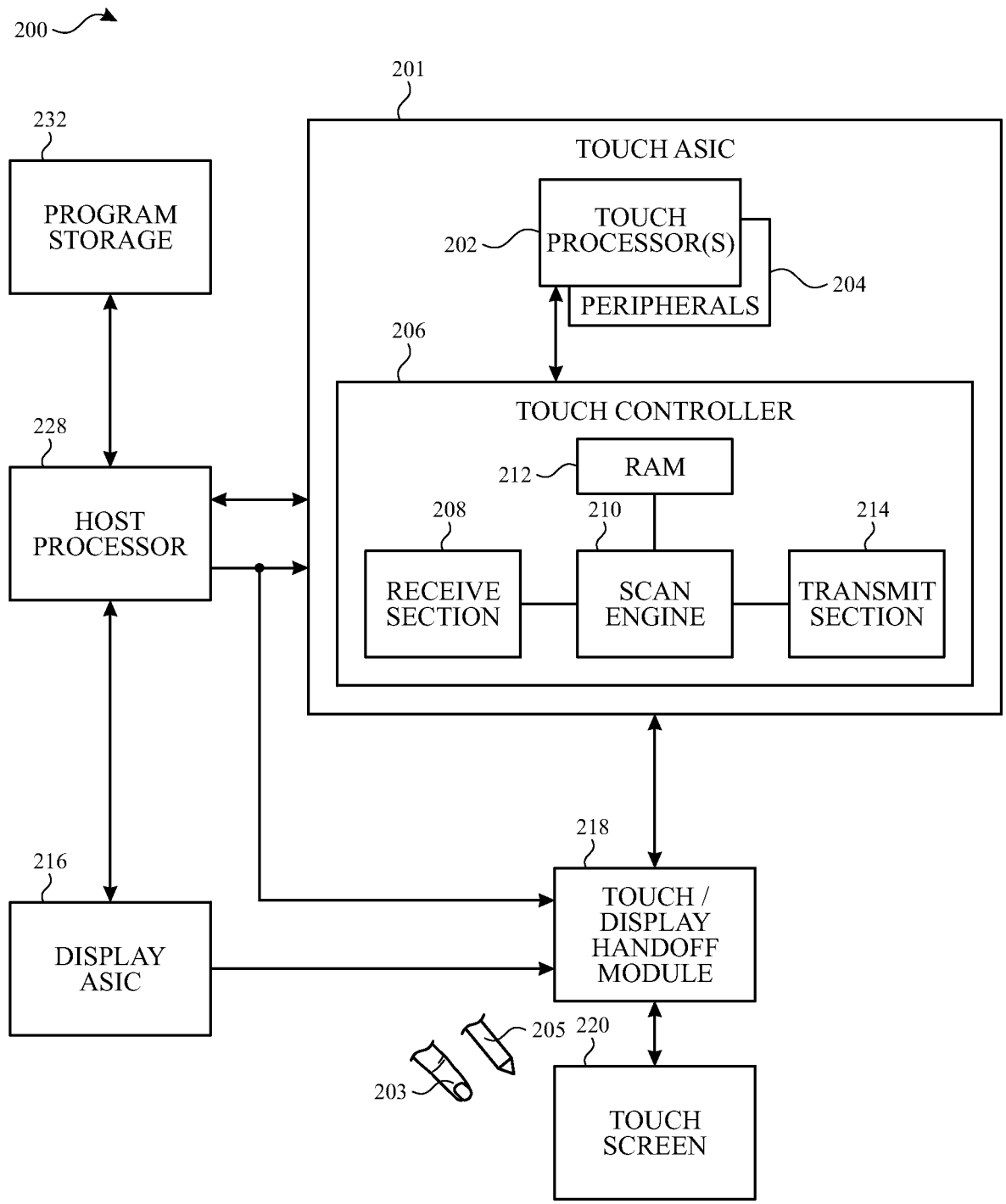
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive section 208, panel scan engine 210 (which can include channel scan logic) and transmit section 214 (which can include analog or digital driver logic). In some examples, the transmit section 214 and receive section 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit section and receive section for the specific scan event to be performed. Results (e.g., touch signals or touch data) from the various scans can also be stored in RAM 212. In addition, panel scan engine 210 can provide control for transmit section 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
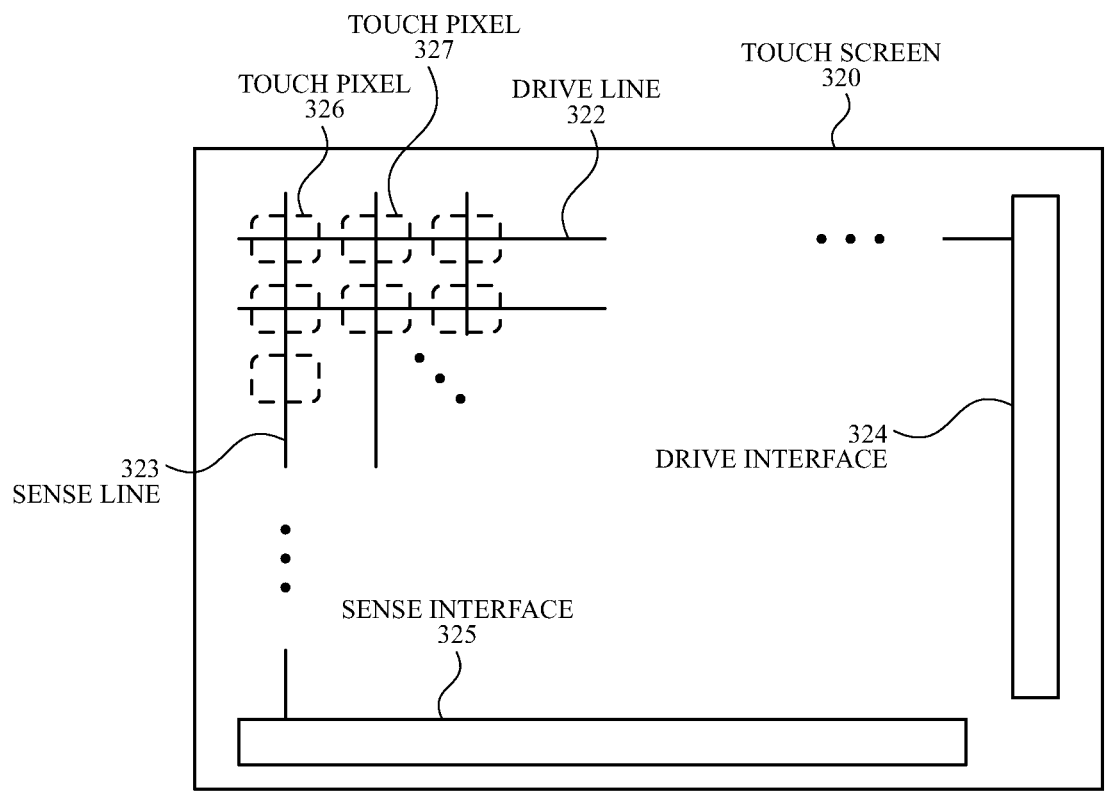
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit section 214 through a drive interface 324, and resulting sense signals generated in sense lines 323 can be transmitted through a sense interface 325 to sense channels in receive section 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
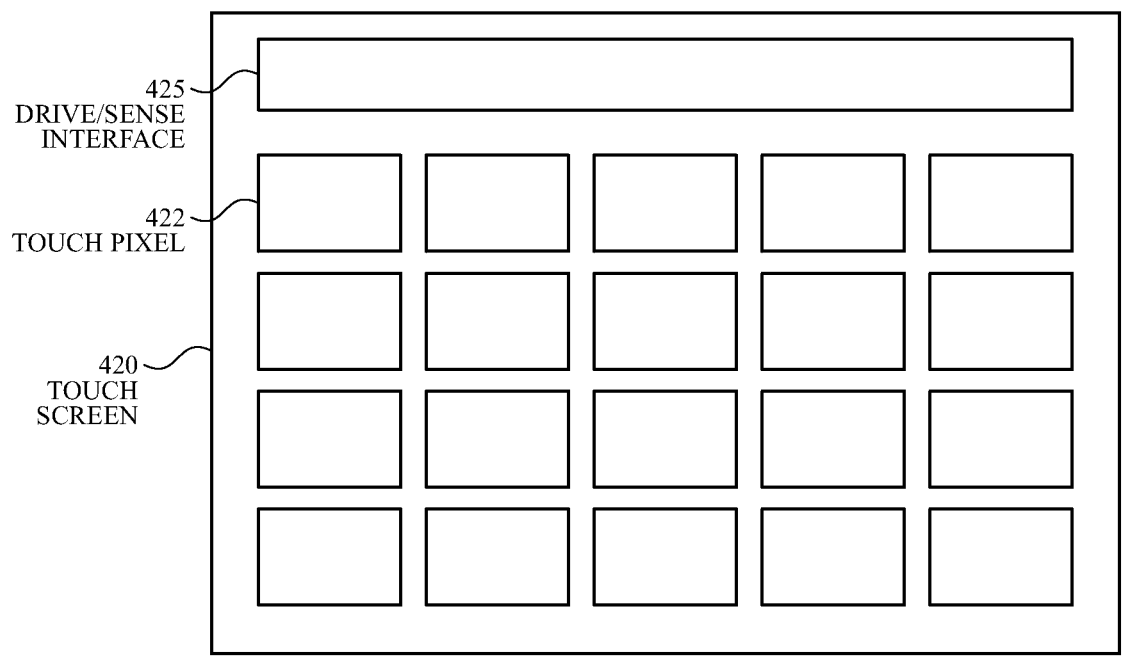
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive section 208 in touch controller 206, can be driven by stimulation signals from the sense channels (or transmit section 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

Figure 5:
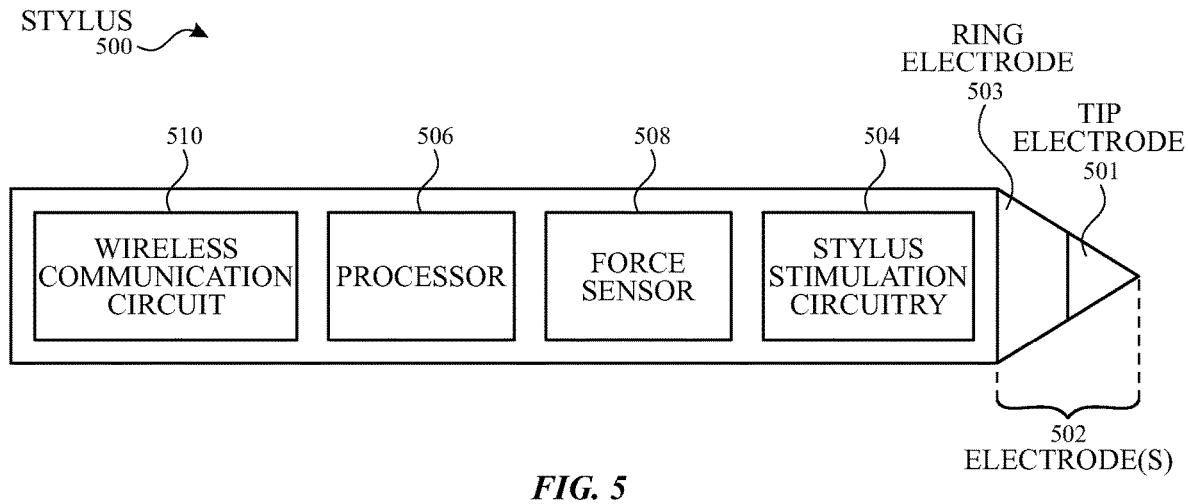
FIG. 5 illustrates an example active stylus according to examples of the disclosure.

As discussed herein, in addition to performing touch scans to detect an object such as a finer or a passive stylus, computing system 200 can also perform stylus scans to detect an active stylus and can communicate with a stylus. For example, an active stylus can be used as an input device on the surface of a touch screen of touch-sensitive device. FIG. 5 illustrates an example active stylus according to examples of the disclosure. Stylus 500 can include one or more electrodes 502, which can be located, for example, at a distal end of the stylus (e.g., the tip of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like.

Stylus 500 can also include stylus stimulation circuitry 504. Stylus stimulation circuitry 504 can be configured to generate one or more stylus stimulation signals at the one or more electrodes 502 to stimulate a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220.

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. In some examples, one or more of the stylus functions described herein can be performed by firmware stored in memory or in program storage (not shown) and executed by processor 506 or a processor in stylus stimulation circuitry 504.

In some examples, stylus 500 can also include a force sensor 508 to detect the amount of force at the tip of the stylus 500. For example, when the stylus tip is touching touch screen 220, the force sensor 508 can measure the force at the stylus tip. The force information can be stored in the stylus (e.g., in a memory (not shown)) and/or transmitted (via a wired connection or wirelessly) to the computing system 200. For example, the force information can be communicated to host processor 228 or touch ASIC 201 in computing system 200. Force information and corresponding location information can be processed together by host processor 240 and/or touch ASIC 201.

In some examples, force sensor 508 can be coupled to processor 506. Processor 506 can process force information from force sensor 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level).

Stylus 500 can also include a wireless communication circuit 510, although in some examples the wireless communication functionality can be incorporated into other modules within the stylus 500, and in other examples the stylus can communicate via a wired connection. Wireless communication circuit 510 can transmit the force information from the stylus 500 to the wireless communication circuitry of computing system 200. The wireless communication circuit 510 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 500, and stylus stimulation circuitry 504 can generate stimulation signals electrodes 502 based on, or at, the one or more low noise frequencies. In some examples, the stylus stimulation circuitry 504 can generate stimulation signals at two or more different frequencies (e.g., at one frequency at the ring electrode and at a second frequency at the tip electrode), though in other examples, stimulation signals are only generated by the stylus at one frequency. In some examples, information, such as information about stylus stimulation frequencies and scan event plans, can be transmitted from touch ASIC 201 to the wireless communication unit of computing system 200 via host processor 228. In other examples, information, such as clock synchronization information, can be communicated directly from touch ASIC 201 to wireless communication unit of computing system 200.

In some examples, stylus 500 can operate asynchronously from the computing system 200. In an asynchronous example, the stylus can continuously generate stimulation signals, generate stimulation signals at various intervals, or generate stimulation signals when force is detected by the force sensor 508. In other examples, wireless communication can be used to synchronize the stylus 500 and computing system 200. For example, the stylus 500 can receive clock synchronization information and scan plans from computing system 200 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the computing system 200 is not expecting stylus stimulation signals, the stylus can stop generating stimulation signals. Additionally, in some examples, the computing system 200 and stylus 500 can synchronize their communication to regular time intervals such that both the computing system 200 and stylus 500 can save power. For example, after the stylus and computing system pair via a wireless communication channel, the communication between the stylus and computing system can occur only at specified times (based on their respective synchronized clocks). Stylus 500 and/or computing system 200 can include one or more crystals to generate stable and accurate clock signals to improve synchronization and reduce drift between the computing system and stylus clocks.

Figure 6:
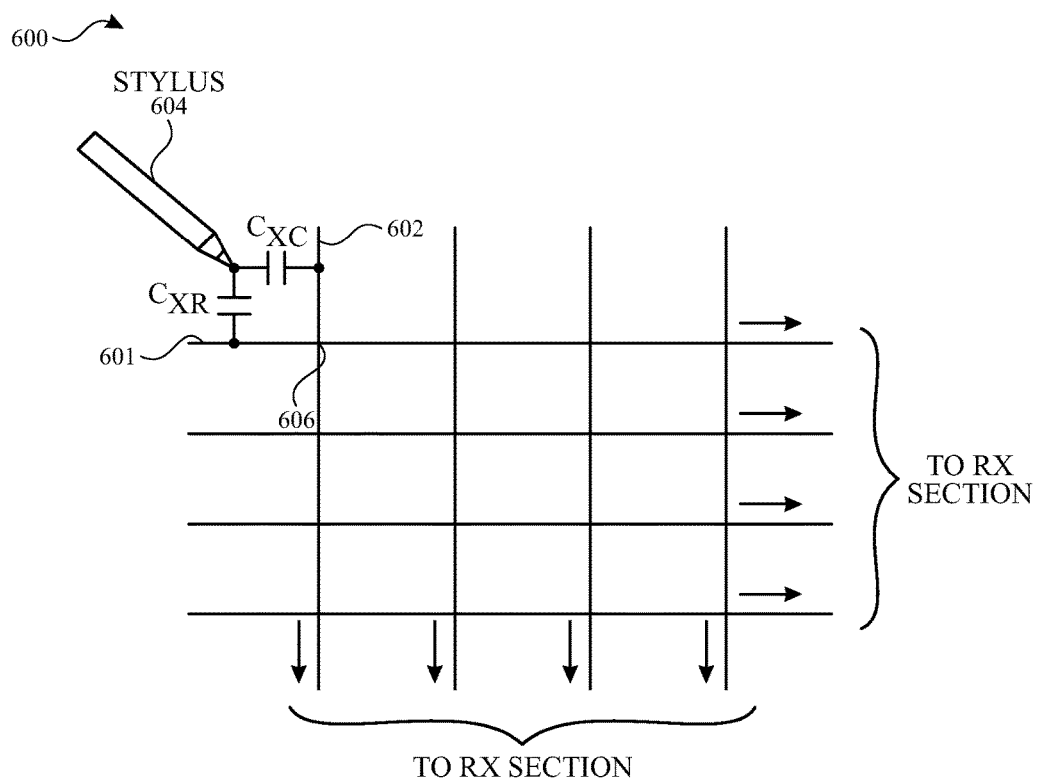
FIG. 6 illustrates an example touch sensor panel configuration operable with the touch ASIC of FIG. 2 to perform a stylus scan according to examples of the disclosure.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit section 214 can be disabled, i.e., no stimulation signals Vstim from the touch controller are sent to touch sensor panel 600. The capacitive coupling (e.g., mutual capacitance) can be received by the receive section 208 from the row and column traces of the one or more touch nodes 606 for processing. As described herein, in some examples the one or more stylus stimulation signals can have one or more frequencies. The one or more frequencies can be selected by the touch ASIC 201 using information from a stylus spectral analysis scan (described below in more detail). This frequency information can be wirelessly communicated to the stylus 604 so that the stylus 604 can generate stimulation signals at the appropriate frequencies.

In some examples, one or more multiplexers can be used to couple row and/or column electrodes to the receive section and/or transmit section. For example, during a mutual capacitance touch sensing scan, row traces can be coupled to the transmit section and column traces can be coupled to the receive section. During a stylus sensing scan, column traces (or row traces) can be coupled via the one or more multiplexers to the receive section to detect input from a stylus or other input device along one axis of the touch screen, and then the row traces (or column traces) can be coupled via the one or more multiplexers to the receive section to detect input from a stylus or other input device along a second axis of the touch screen. In some examples, the row and column traces can be sensed simultaneously. In some examples, the stylus can be detected on the column traces concurrently with the mutual capacitance scan touch sensing scan. The touch and stylus signals can be differentiated by filtering and demodulating the received response signals at different frequencies.

Figure 7:
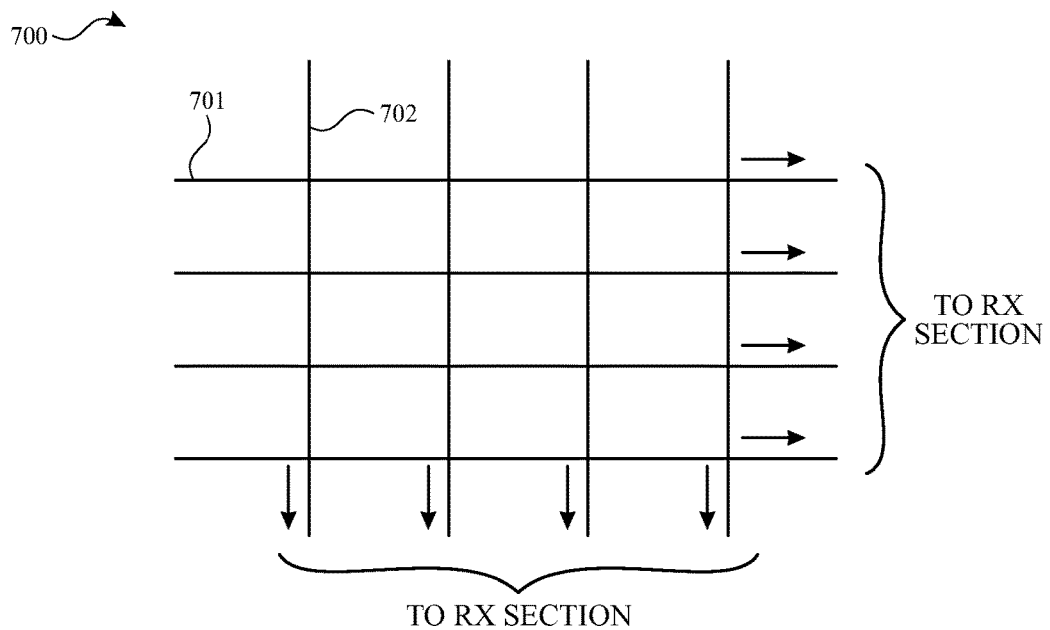
FIG. 7 illustrates an example touch sensor panel configuration operable with the touch ASIC of FIG. 3 to perform a stylus spectral analysis scan according to examples of the disclosure.

FIG. 7 illustrates an example touch sensor panel configuration operable with the touch ASIC of FIG. 3 to perform a stylus spectral analysis scan according to examples of the disclosure. During a stylus spectral analysis scan or a touch spectral analysis scan, the transmit section 214 can be disabled, i.e., no stimulation signals Vstim are sent to touch sensor panel 700, while some or all of the row traces 701 and column traces 702 can be coupled to the receive section 208. The receive section 208 can receive and process touch signals from some or all of the rows and columns of the touch sensor panel 700 in order to determine one or more low noise frequencies for use during subsequent touch and/or stylus scans.

When the stylus 500 first connects or reconnects wirelessly to the computing system 200 it can receive frequency information from the computing system 200. A stylus spectral analysis scan can determine one or more clean frequencies for the stylus to use to generate one or more stimulation signals. The computing system 200 and stylus 500 can communicate (including, for example, performing a handshake between the two devices) and computing system 200 can transmit the frequency information to the stylus 500 such that the stylus knows the appropriate one or more frequencies to use to generate one or more stimulation signals.

The stylus 500 can change at least one stimulation frequency as a result of a stylus spectral analysis scan. In a synchronous system, a stylus spectral analysis scan can execute while the stylus 500 is predicted to not be generating a stimulation signal, e.g., when a stylus scan is not executing. After completing the stylus spectral analysis scan, the frequency information can be communicated wirelessly to stylus 500 and the communication can cause the stylus 500 to change the one or more stimulation frequencies. The computing system 200 can then switch the one or more frequencies used for demodulating stylus scan events when the stylus 500 has switched frequencies.

In other examples, stylus 500 can be asynchronous such that the stylus 500 can generate one or more stimulation signals at one or more stimulation frequencies irrespective of the timing of the stylus scan event. As a result, the stylus 500 can be stimulating the touch sensor panel during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the computing system 200 can assume that stylus lift-off will eventually occur and wait until lift-off to initiate a stylus spectral analysis scan. The computing system 200 can predict a lift-off condition using the results of other scans, e.g., stylus scans, or stylus force information to predict that the stylus is not on the panel, and then perform a stylus spectral analysis scan.

Figure 8:
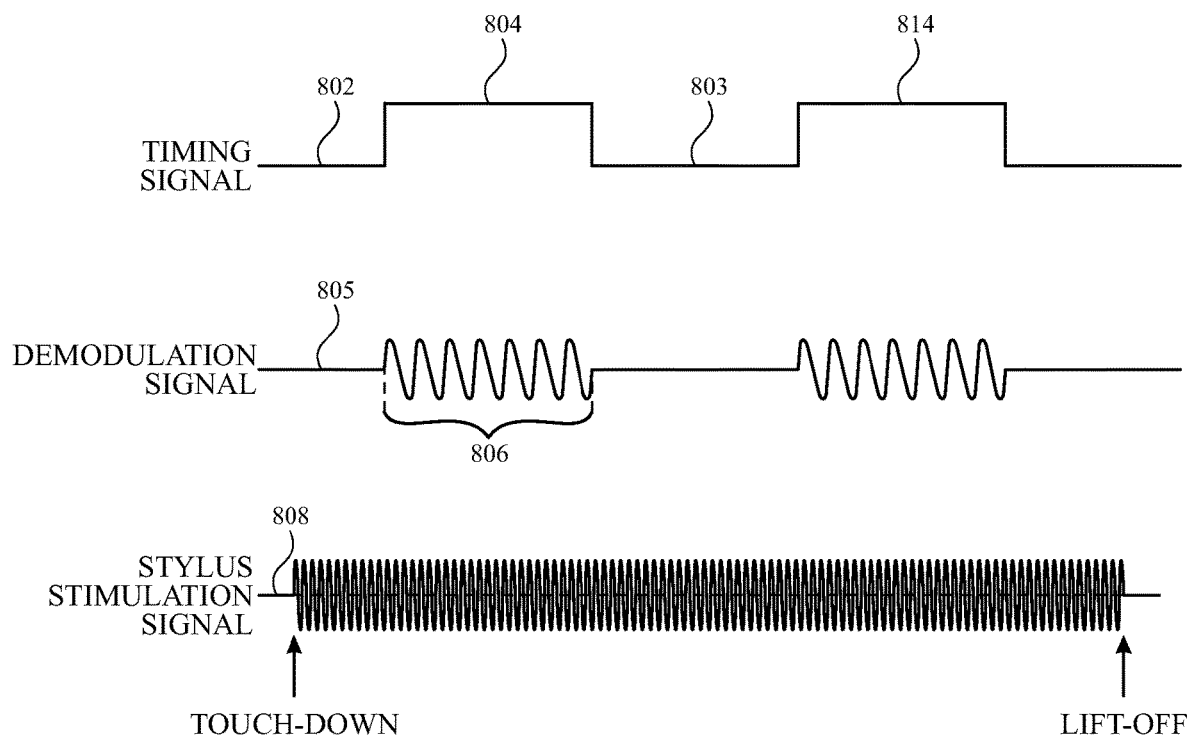
FIG. 8 illustrates an example of a timing diagram of touch demodulation signals and stylus stimulation signals according to examples of the disclosure.

Using an active stylus that can generate stimulation signals with a touch-sensitive device that can also generate stimulation signals can result in interaction between the various stimulation signals. In order to reduce the interference, the touch sensing system of the touch-sensitive device can generate stimulation signals at a different frequency than the stimulation signals generated by the active stylus. The touch-sensitive device can include a plurality of filters (e.g., bandpass filters) to isolate the received signals for demodulation and processing corresponding to the stimulation generated by the stylus and the stimulation generated by the touch-sensitive device. FIG. 8 illustrates an example timing diagram of touch demodulation signals and stylus stimulation signals according to examples of the disclosure. FIG. 8 illustrates a timing signal 802 that can correspond to a synchronization signal used by the touch-sensitive device to determine the operation of the touch system. For example, period 804 and period 814, when timing signal 802 is logic high, can correspond to periods when the touch system of the touch-sensitive device can perform a touch sensing scan. Period 803, when timing signal 802 is logic low, can correspond to a period when the touch system is not performing a touch sensing scan (e.g., idling or performing some other operation). The polarity of the timing signal is for illustration purposes and can be different (e.g., reversed) in other examples.

During the touch sensing scan (e.g., performed during period 804 and period 814), the touch system can generate stimulation signals and receive response signals and can process the received response signals to detect an object (e.g., a finger or passive stylus) touching or proximate to the surface of the touch screen. The processing can include demodulating the received response signals, for example, by mixing the received response signals with one or more demodulation signals having the same frequency as the stimulation signals generated by the touch system. For example, an in-phase and quadrature demodulation (IQ demodulation) can include mixing the received response signals with a first demodulation signal that is in-phase with and at the same frequency as the stimulation signals to generate an in-phase component and can include mixing the received response signal with a second demodulation signal that is 90 degrees out-of-phase with and at the same frequency as the stimulation signals to generate a quadrature component. The demodulation described herein is illustrated in FIG. 8 by the oscillation segments of demodulation signal 805. For example, segment 806 illustrates the oscillation of demodulation signal 805 corresponding to the demodulation during period 804. Period 803, in contrast, can correspond to periods when a touch sensing scan (or other scanning requiring a demodulation signal) is not performed, which can be illustrated in FIG. 8 by segments having no oscillation in demodulation signal 805 corresponding to period 803. Demodulation signal 805, having segments with and without oscillation, is only representative and may not correspond to a demodulation signal in the touch system.

Figure 9:
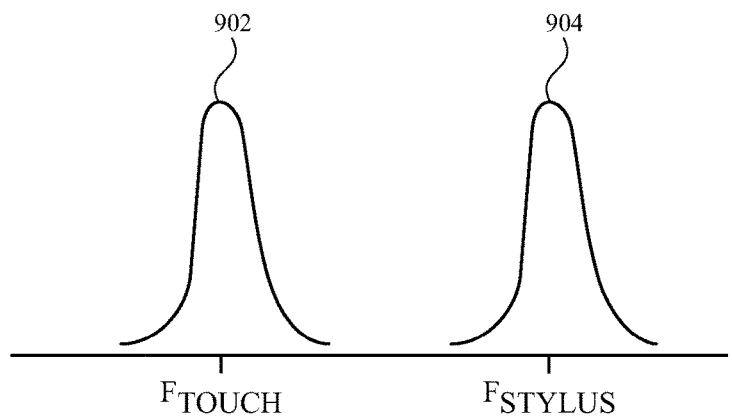
FIG. 9 illustrates an example frequency domain representation of the response signals received during a touch sensing scan shown in FIG. 8 according to examples of the disclosure.

FIG. 8 also illustrates stylus stimulation signal 805. An active stylus can, for example, begin generating stimulation signals at touch-down (e.g., when a force or pressure sensor is activated) and stop generating stimulation signals at lift-off (e.g., when a force or pressure sensor is deactivated). The frequency of oscillation of the stylus stimulation signals can be different than the frequency of the touch stimulation (and demodulation) signals to reduce interaction between the two stimulation signals. FIG. 9 illustrates an example frequency domain representation of the response signals received during period 804. The response signals received during period 804 can include two peaks. Peak 902 can correspond to the signal contribution at the frequency of stimulation signals generated by the touch system and peak 904 can correspond to the signal contribution at the frequency of stimulation signal generated by the active stylus. One or more bandpass filters can be used to separate the signal contributions corresponding to stimulation signals from the active stylus and touch sensing system, respectively.

FIG. 8 illustrates the stylus stimulation signal beginning and ending when the timing signal corresponds to periods when the touch system is not performing a touch sensing scan. In this example, the stylus stimulation signals are received during the entirety of touch demodulation periods corresponding to period 804 and period 814. Because they appear consistently throughout the touch sensing scan periods, rather than acting as a source of noise for processing of received response signals to detect an object (e.g., a finger or passive stylus) touching or proximate to the surface of the touch-sensitive device, the contribution from the stylus stimulation signals can be averaged out.

Figure 10:
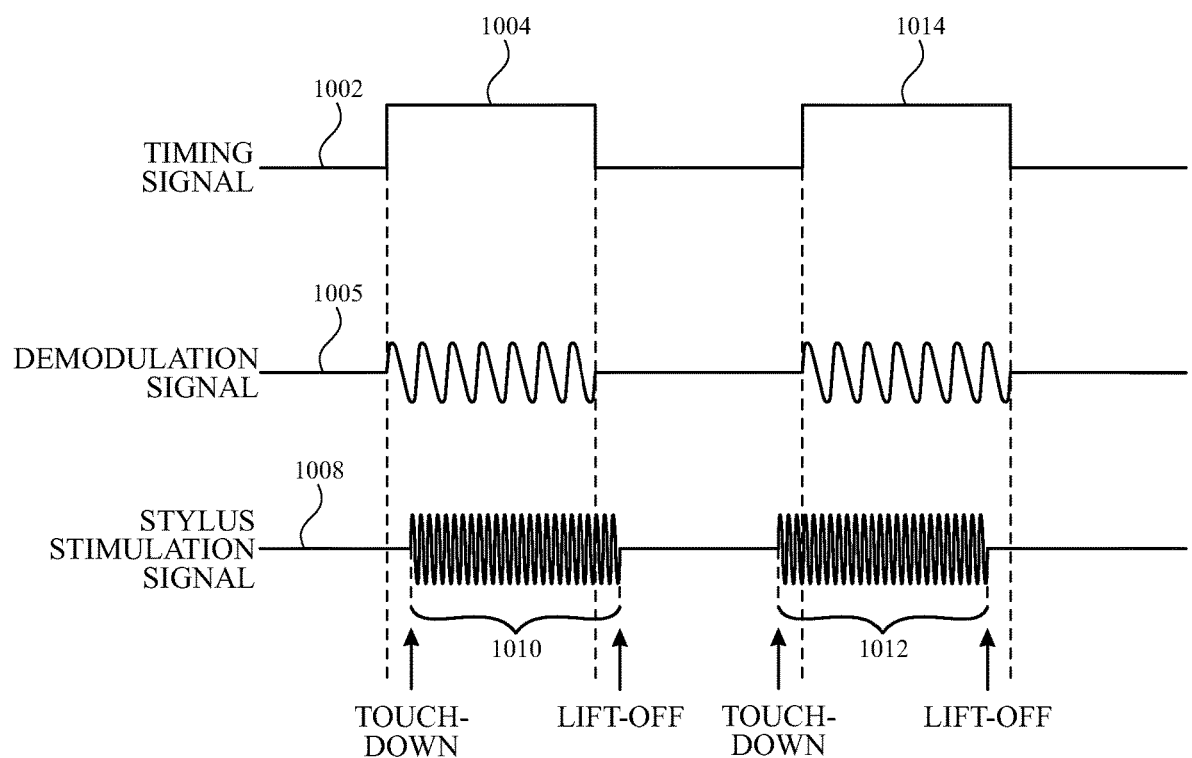
FIG. 10 illustrates another example timing diagram of touch demodulation signals and stylus stimulation signals according to examples of the disclosure.

FIG. 10 illustrates another example timing diagram of touch demodulation signals and stylus stimulation signals according to examples of the disclosure. Timing signal 1002 and demodulation signal 1005 can correspond to timing signal 802 and demodulation signal 805 of FIG. 8. Stylus stimulation signal 1008 includes two segments corresponding to two periods of the stylus generating stimulation signals. Segment 1010 can correspond to a stylus generating stimulation signals beginning during period 1004 and ending after period 1004. Segment 1014 can correspond to the stylus generating stimulation signals beginning before period 1014 and ending during period 1014. For a stylus configured to generate stimulation signals based on a force or pressure sensor, segment 1010 can correspond to the stylus touch-down during period 1004 and lift-off after period 1004. Similarly, segment 1012 can correspond to stylus touch-down before period 1014 and lift-off during period 1014.

Figure 11:
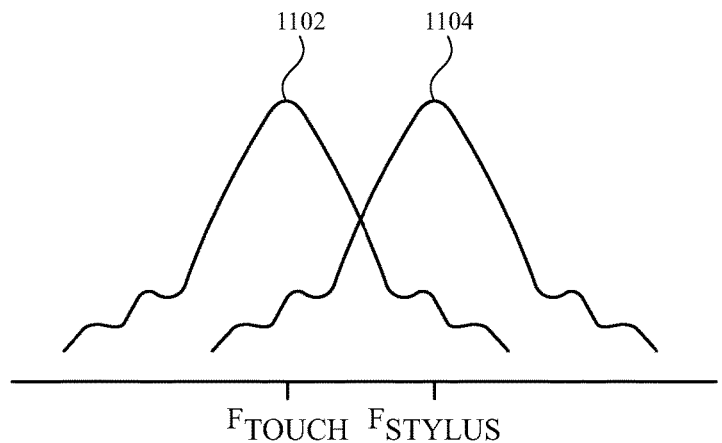
FIG. 11 illustrates another example frequency domain representation of response signals received during a touch sensing scan shown in FIG. 10 according to examples of the disclosure.

When stylus stimulation signals received at the touch-sensitive device begin or end stimulation during a period when the touch system is performing a touch sensing scan, as shown in FIG. 10, the interaction between the stimulation signals generated by the active stylus and the touch system can result in noise that can degrade the performance of the touch system. The noise generated when stylus touch-down or lift-off occurs during a touch demodulation period can result in a non-zero average, creating an offset in the demodulated touch signals. Receiving stylus stimulation signals beginning or ending in the middle of a touch demodulation period can result in additional interaction between the contributions of the received response signals from the stylus and touch system. FIG. 11 illustrates an example frequency domain representation of the response signals received during period 1004 or period 1014. The response signals received during period 1004 or 1014 can include two peaks. Peak 1102 can correspond to the signal contribution at the frequency of stimulation signals generated by the touch system and peak 1104 can correspond to the signal contribution at the frequency of stimulation signal generated by the active stylus. Due to the noise generated by the beginning or ending stylus stimulation signals during the touch demodulation period, however, there can be bleed-over between peak 1102 and peak 1104. The use of bandpass filters to separate the signal contributions corresponding to stimulation signals from the active stylus and touch sensing system, respectively, can result in loss of some signal which can reduce the performance of the touch system in detecting the location of contacts from a finger or passive stylus.

In some examples, when the touch system detects a stylus touch-down or lift-off during a touch sensing scan, the system can discard the results of the touch sensing scan that may be defective due to noise from stylus touch-down or lift-off. For example, the system can perform stylus sensing scan to detect the presence and/or location of an active stylus. The system can also perform one or more touch sensing scans to detect the presence and/or location of a finger or passive stylus touching. When the stylus is detected lifting off (e.g., previous stylus sensing scan detected an active stylus and current stylus sensing scan detects no active stylus) or touching down (e.g., previous stylus sensing scan detected no active stylus and current stylus sensing scan detects an active stylus) during a current sensing scan, the system can discard scanning results of the one or more touch sensing scans between the previous stylus sensing scan and the current stylus sensing scan. In other words, the system can drop touch sensing scans that may be corrupted by stylus touch-down or lift-off. Dropping touch sensing scans, however, can also reduce performance due to lost sensing results. Performance can be significantly reduced when stylus touch-down and lift-off occur frequently.

Figure 12:
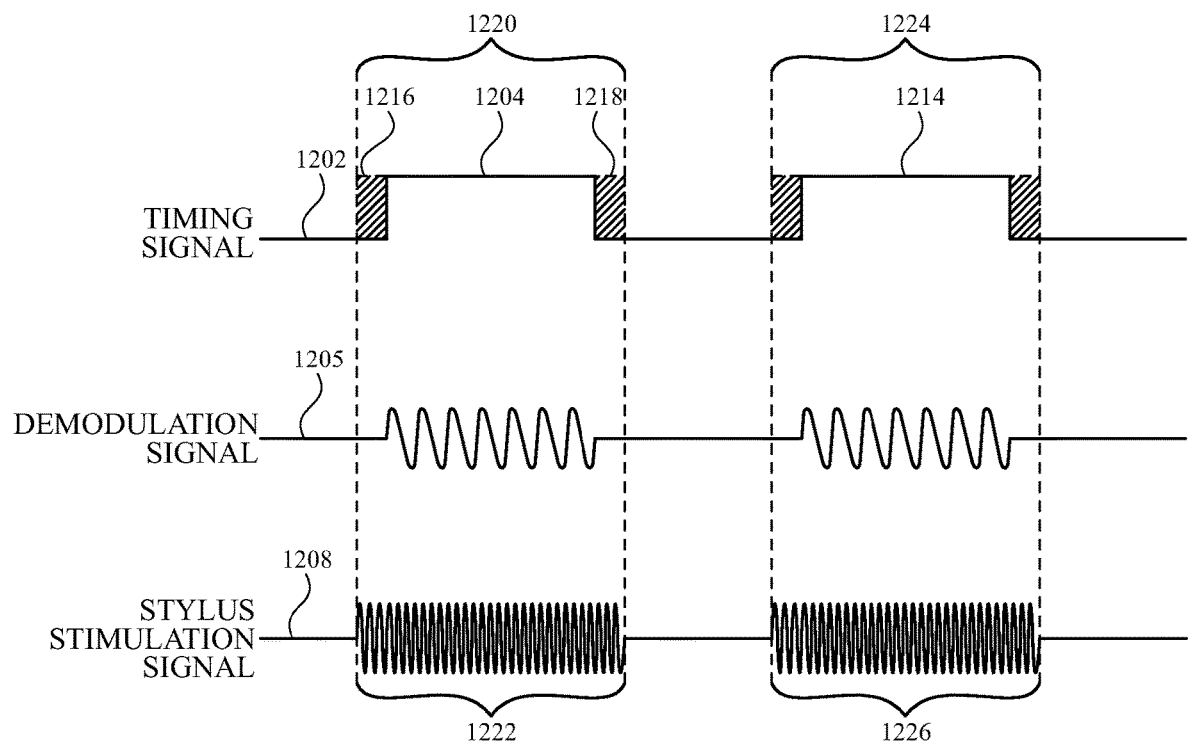
FIG. 12 illustrates an example timing diagram of touch demodulation signals and synchronous stylus stimulation signals according to examples of the disclosure.

In other examples, the stylus and touch system can be synchronized. For example as discussed above, the active stylus can receive clock synchronization information and scan plans from computing system such that it can generate stimulation signals when the computing system expects such stimulation signals from the stylus. The stylus can save power by generating stimulation signals only when the computing system is performing a stylus sensing scan. Additionally, synchronizing the stylus and touch system can reduce the interaction between the stylus stimulation signals and touch demodulation. FIG. 12 illustrates an example timing diagram of touch demodulation signals and synchronous stylus stimulation signals according to examples of the disclosure. Timing signal 1202 and demodulation signal 1205 can correspond to timing signal 802 and demodulation signal 805 of FIG. 8. Stylus stimulation signal 1208 includes two segments corresponding to two periods of the stylus generating stimulation signals. Segment 1222 can correspond to a stylus generating stimulation signals beginning before period 1204 and ending after period 1204. Segment 1226 can correspond to the stylus generating stimulation signals beginning before period 1214 and ending after period 1214. With perfect synchronization (e.g., if the stylus clock and touch system clock remain in sync) the stylus stimulation signal could begin to oscillate on the rising edge of timing signal 1202 at the beginning period 1204 and the stylus stimulation signal could cease to oscillate on the falling edge of the timing signal 1202 at the end of period 1024. However, in order to ensure that the stylus stimulation signal remains active for period 1204, the stylus can begin generating stimulation signals a short time before period 1204 and a short time after period 1204. The time periods before and after period 1204 are represented in FIG. 12 by guard bands 1216 and 1218. Stylus stimulation signal 1208 can be active during period 1222 which can correspond to some or all of period 1220 which can include guard bands 1216 and 1218 and period 1204. The touch system can idle during the guard band periods. Likewise, stylus stimulation signal 1208 can be active during period 1226 which can correspond to some or all of period 1224 which can include period 1214 and adjacent guard bands.

Figure 13:
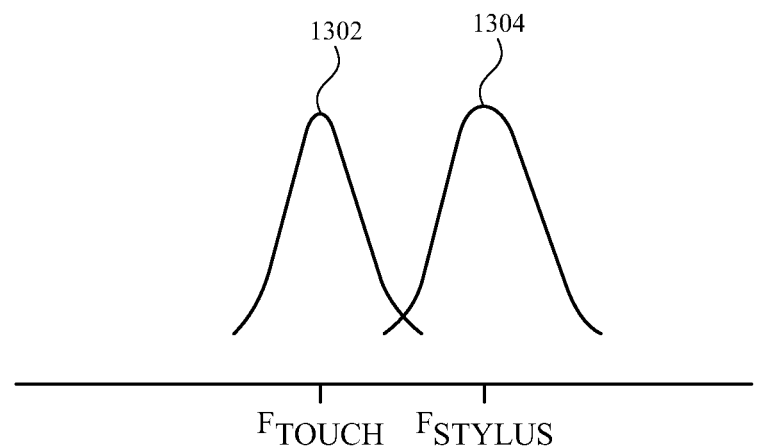
FIG. 13 illustrates another example frequency domain representation of response signals received during a touch sensing scan shown in FIG. 12 according to examples of the disclosure.

FIG. 13 illustrates an example frequency domain representation of the response signals received during period 1204 or period 1214. The response signals received during period 1204 or 1214 can include two peaks. Peak 1302 can correspond to the signal contribution at the frequency of stimulation signals generated by the touch system and peak 1304 can correspond to the signal contribution at the frequency of stimulation signal generated by the active stylus. The active stylus can result in some bleed-over between peak 1302 and peak 1304. The bleed-over between peak 1302 and peak 1304 can be reduced compared with the bleed-over between peak 1102 and peak 1104 of FIG. 11. For example, when using one or more filters (e.g., band-pass filters) to isolate the signal contributions corresponding to touch from the signal contributions corresponding to stylus, the reduced overlap between peaks results in less signal lost due to filtering.

Figure 14:
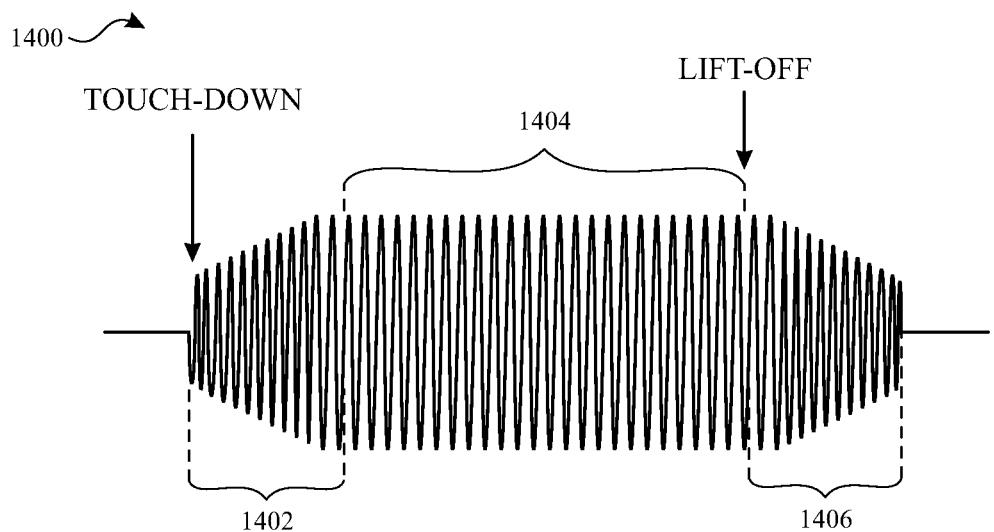
FIG. 14 illustrates an example of a stylus stimulation signal according to examples of the disclosure.

Additionally or alternatively, in other examples, the stylus stimulation signals can be generated with a specific profile to minimize the interaction between the stylus stimulation signals and touch demodulation. FIG. 14 illustrates an example of a stylus stimulation signal according to examples of the disclosure. The stylus can generate no stimulation signal before the stylus touch-down occurs. When stylus touch-down is detected, for example by a force sensor, the stylus can begin generating a stylus stimulation signal. During period 1402, the stylus can ramp up the amplitude of the stylus stimulation signal. When the desired full peak-to-peak amplitude of the stylus signal is achieved, the stylus can continue to generate stimulation signals at the full peak-to-peak amplitude for period 1404. When stylus lift-off is detected, for example by the force sensor, the stylus can begin ramping down the amplitude of the stylus stimulation signal during period 1406. The ramp up or ramp down can include a linear or non-linear change in the amplitude of the stimulation signal. The rate of change in the amplitude during the ramp up (i.e., the slew rate) can be the same or different than the rate of change in the amplitude during the ramp down.

Additionally or alternatively, in some examples, the stylus stimulation signal can ramp up after touch-down is detected, but when lift-off is detected, rather than ramp down, the stylus can continue to generate stimulation signals at the full peak-to-peak amplitude for a threshold period of time. The threshold period of time can be measured from the time lift-off is detected. Although the stimulation signals generated by the stylus after lift-off may not generate signal the shaping described above, the effect of increasing the distance between the stylus and the touch screen at lift-off can have similar impact on the signals detected by the touch-sensitive device with which the stylus can be used. For example, lifting the stylus off of the surface while continuing to generate stylus stimulation signals can appear to the touch-sensitive device to have a similar shaping as ramping down the stylus stimulation signal from within the stylus.

In examples with a synchronous stylus, the stylus can begin ramping up or ramping down the stylus stimulation signals as illustrated in FIG. 14 before and after sensing scans (e.g., during the guard band periods), rather than in response to detecting stylus touch-down or lift-off. Shaping the stylus stimulation signal in addition to synchronizing the stylus to generate stimulation signals at specific times can save power and can allow for shorter duration guard band periods. Reducing the guard band periods can reduce the amount of idle time for the touch system.

Although FIG. 14 illustrates the stylus signal as a sinusoidal signal, the stylus stimulation signal can be different. For example, the stylus stimulation signal can be a saw-tooth or trapezoidal waveform, or the like. Ramping up or down the stylus stimulation signal can be performed manually though a series of steps or automatically. In a manual configuration, for example, during each adjustment cycle (i.e., each adjustment of the amplitude of the stimulation signal) of the ramp up (or ramp down) of the stylus stimulation signal, the stylus processor can instruct the stylus stimulation circuitry to generate stimulation based on one or more parameters. For example, during each adjustment cycle, the processor can communicate (e.g., via an SPI bus) an amplitude parameter to the stylus stimulation circuitry and the stylus stimulation circuitry can generate a stimulation signal of the appropriate amplitude corresponding to the amplitude parameter. The duration of the adjustment cycle can be set based on the stylus stimulation frequency, for example. The parameters defining the ramp-up or ramp-down can be stored in a look-up table (LUT) or other memory.

Figure 15:
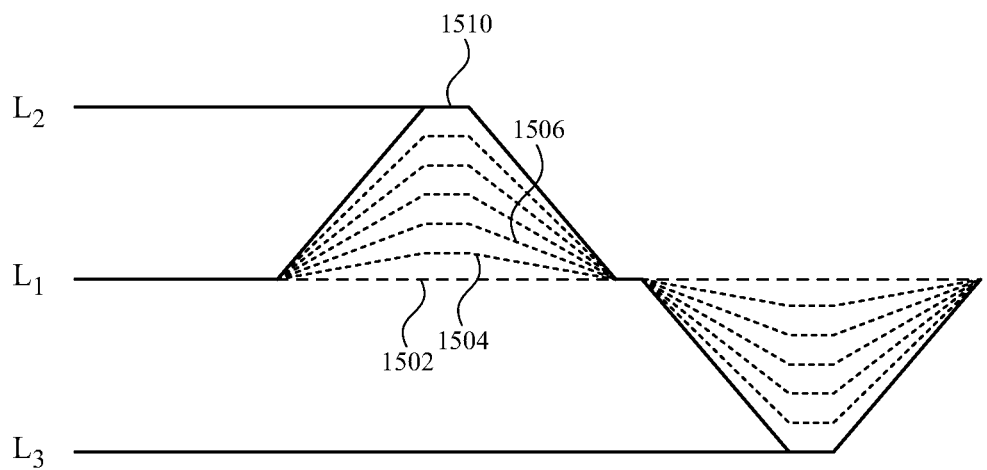
FIG. 15 illustrates an example trapezoidal stylus stimulation waveform according to examples of the disclosure.

FIG. 15 illustrates an example trapezoidal stylus stimulation waveform according to examples of the disclosure. The trapezoidal signal illustrated in FIG. 15 can transition between three different levels (labeled "L1", "L2" and "L3") for the full peak-to-peak amplitude waveform 1510, although a different number of levels can be implemented (e.g., a 5-level, 7-level, etc.). Peak-to-peak amplitude is measured between L2 and L3 for waveform 1510. When the stylus is not generating the stimulation signal, as represented by waveform 1502, the stylus can remain at level L1 which can correspond to a 0V output or some other DC output voltage or current for a peak-to-peak amplitude of zero (with the possibility of a DC offset). When the stylus begins generating stimulation signals, the stylus can generate 3-level stimulation signals where the L1 remains the intermediate level and the peak-to-peak amplitude of the waveform increases (for ramp up) or decreases (for ramp down) between a zero and a full peak-to-peak amplitude. For example, the peak-to-peak amplitude of waveform 1504 can be greater than the peak-to-peak amplitude of waveform 1502. Likewise, the peak-to-peak amplitude of waveform 1506 can be greater than the peak-to-peak amplitude of waveform 1504. During ramp up, the peak-to-peak amplitude can increase from zero in waveform 1502 to the full desired peak-to-peak amplitude of waveform 1510. During ramp down, the peak-to-peak amplitude can decrease from the full desired peak-to-peak amplitude of waveform 1510 to zero in waveform 1502.

In the manual configuration, the amplitude parameter can correspond to the peak-to-peak amplitude of each waveform. For example, during the ramp up, the stimulation circuitry can receive a first parameter to generate a waveform corresponding to waveform 1502, a second parameter to generate a waveform corresponding to waveform 1504, etc., and then a waveform corresponding to waveform 1510. In other examples, the amplitude parameter can be used by the stimulation circuitry to generate each level transition for the stylus stimulation signal. The stylus can receive a parameter to transition the a stylus stimulation signal to the high level for waveform 1502, then a parameter to transition the stylus stimulation signal to level L1 for waveform 1502, then a parameter to transition the stylus stimulation signal to the low level for waveform 1502 and then a parameter to transition the stylus stimulation signal level L1 for waveform 1502. Similarly, parameters can be provided for each level transition for each waveform during the ramp up (or ramp down).

In an automatic configuration, the stylus processor can communicate parameters to the stylus stimulation circuitry and the stylus stimulation circuitry can automatically ramp-up and ramp-down the stylus stimulation signal based on the parameters. For example, the processor can transmit parameters such as frequency, amplitude and slew rate. The stylus stimulation circuitry can use a closed-loop algorithm to automatically generate the output stimulation signals to ramp up or ramp down the stylus stimulation signal based on the target amplitude and slew rate, for example.

Figure 16:
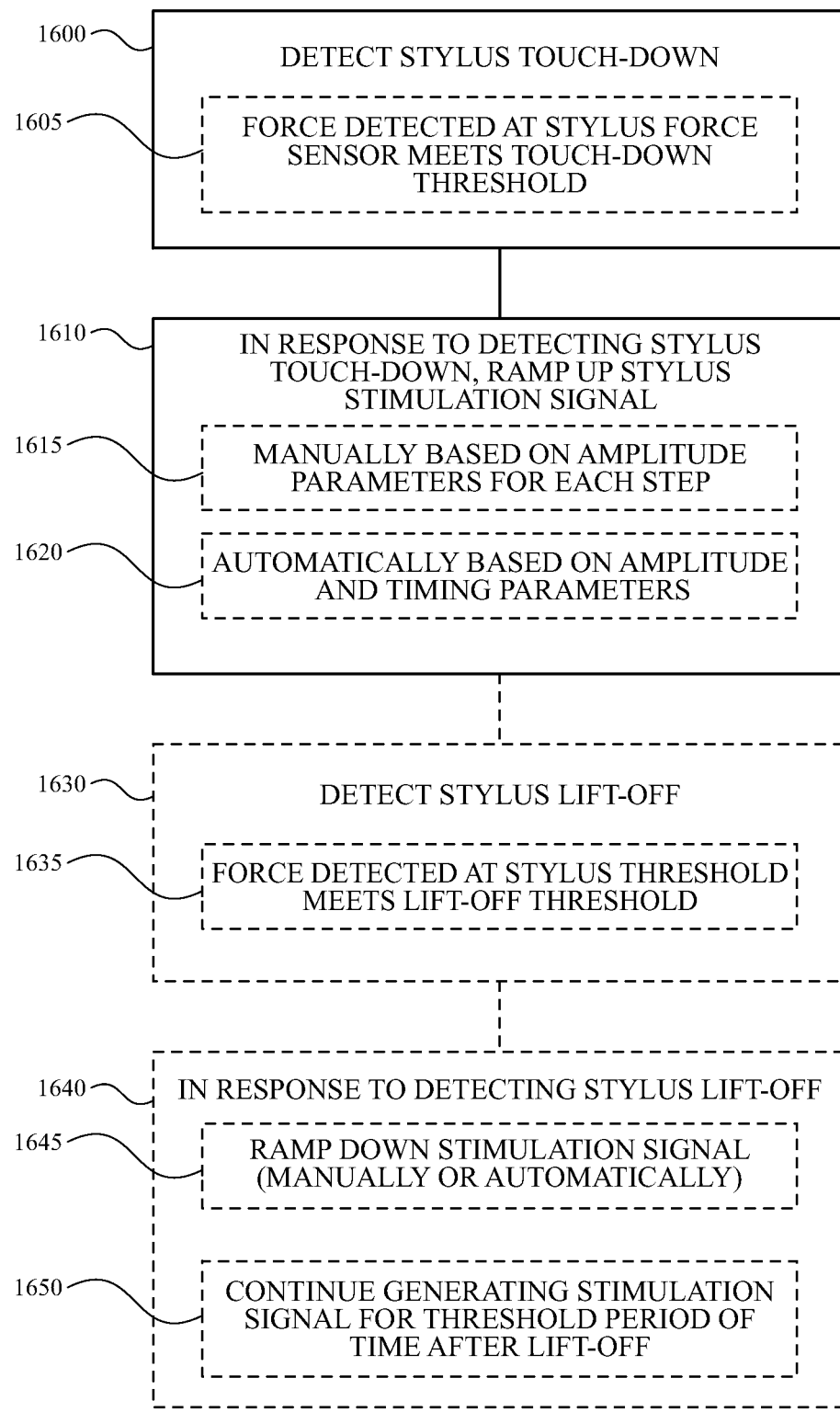
FIG. 16 illustrates an example process for mitigating noise from stylus touch-down and lift-off according to examples of the disclosure.

FIG. 16 illustrates an example process for mitigating noise from stylus touch-down and lift-off according to examples of the disclosure. The stylus can detect a touch-down event (1600). Detecting touch-down can include detecting a force at a force sensor in the stylus, e.g., at the tip of the stylus, that meets a touch-down threshold (1605). The touch-down threshold can be selected to avoid false positives, i.e., detecting stylus touch-down when the stylus is not in contact with a surface. In other examples, touch-down can be detected using the results of stylus scans. In response to detecting a stylus touch-down event, the stylus can begin generating stylus stimulation signals, which can ramp up to a desired peak-to-peak amplitude (1610). As described herein, the stylus stimulation signals can be generated by stylus stimulation circuitry 504, which can be controlled by processor 506. In some examples, ramping up the stylus stimulation signal can be performed manually based on an amplitude parameter for a given step in generating the stylus stimulation signal (1615). The amplitude parameter can be provided to the stylus simulation circuitry 504 by the processor 506, in some examples. The amplitude parameter can be stored in a LUT and accessed by the processor and/or the stylus stimulation circuitry. In some examples, the LUT can store values that generally parameterize the stimulation waveform, and a scaling parameter can be used to scale the amplitude parameter stored in the LUT to ramp up (or down) the amplitude of the stylus stimulation signal. In other examples, ramping up the stylus stimulation signal can be performed automatically based on an amplitude parameter and a timing parameter (1620). The amplitude parameter can be a desired full peak-to-peak amplitude and the timing parameter can be a slew rate parameter. The stylus stimulation circuitry can generate the stylus stimulation signal base on the amplitude and timing parameters. For example, the stylus can scale up the amplitude of the signal from an initial value (e.g., zero) to the desired full peak-to-peak amplitude using a closed-loop algorithm. The timing parameter can be used by the stylus to determine the amount of time the closed-loop algorithm should take to ramp up (or down) the stimulation signal. The stylus can detect a lift-off event (1630). Detecting lift-off can include detecting a force at a force sensor in the stylus, e.g., at the tip of the stylus, that meets a lift-off threshold (1635). The lift-off threshold can be the same as the touch-down threshold, or it can be a different threshold. The touch-down threshold can be selected to avoid false negatives, i.e., detecting stylus lift-off when the stylus is still in contact with a surface. In other examples, lift-off can be detected using the results of stylus scans. In response to detecting a stylus lift-off event, the stylus can stop generating stylus stimulation signals (1640). In some examples, the stylus can stop generating stylus stimulation signals by ramping down from the desired full peak-to-peak amplitude to a DC amplitude (e.g., zero) (1640). The stylus can ramp down the stylus stimulation signals manually or automatically, which can be similar to the process of manually or automatically ramping up the stylus stimulation signals (1645). In some examples, rather than ramping down the stylus stimulation signal after lift-off, the stylus can continue generating the desired full peak-to-peak amplitude signals for a threshold length of time after detecting the stylus lift-off event, and the shaping of the stylus signal can be mimicked due to the change in proximity of the stylus and the touch screen (1650). For example, stylus lift-off corresponds to increasing the distance between the stylus electrodes and the touch screen. The increase in distance can reduce the coupling between the stylus and touch screen electrodes, and as a result, continuing to stimulate the stylus at the desired full peak-to-peak amplitude will be sensed as if the stylus stimulation signal were ramped down in response to lift-off.

Figure 17:
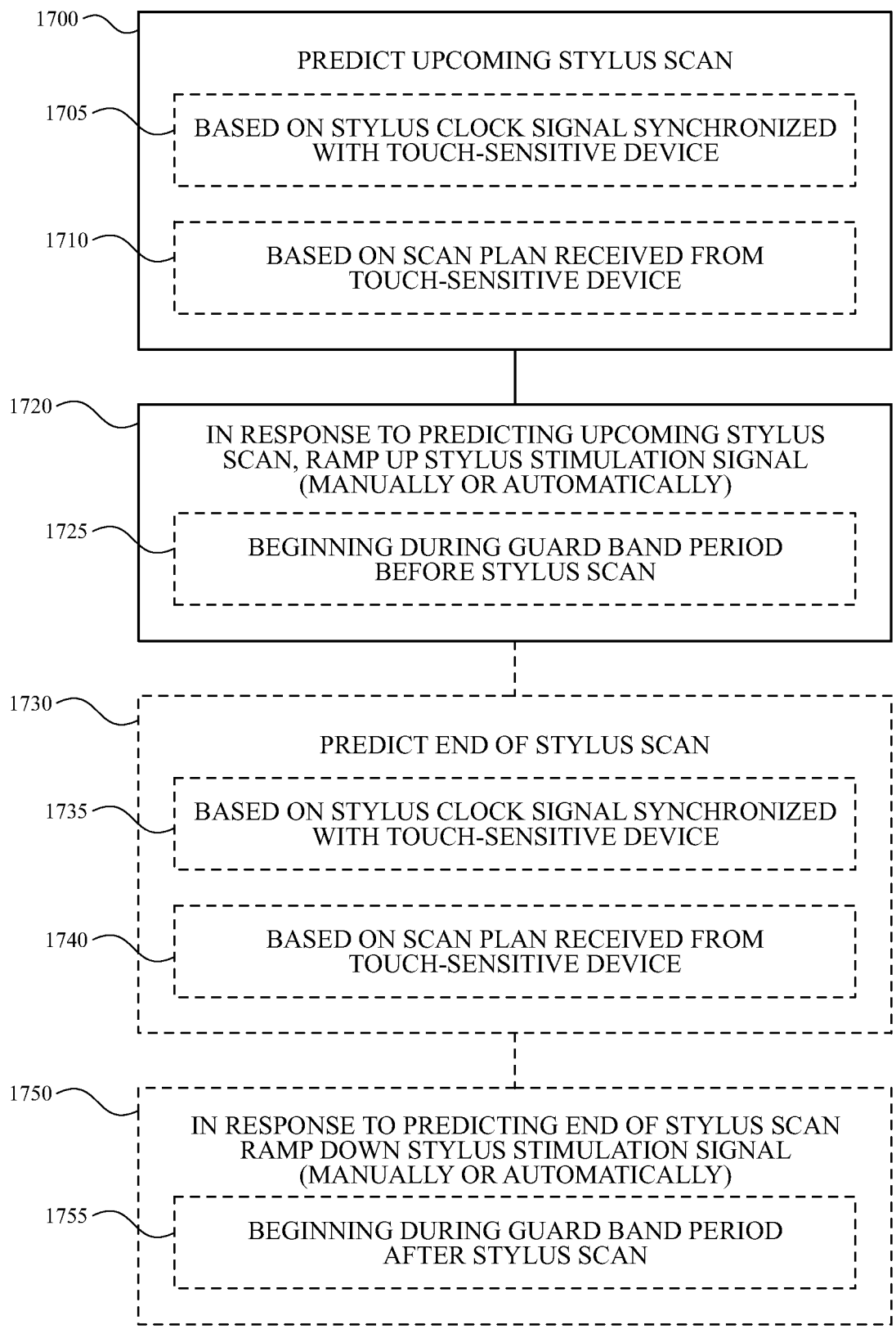
FIG. 17 illustrates another example process for mitigating noise from stylus touch-down and lift-off according to examples of the disclosure.

FIG. 17 illustrates another example process for mitigating noise from stylus touch-down and lift-off according to examples of the disclosure. The stylus can predict an upcoming stylus scan (1700). The upcoming scan can be predicted based on a stylus clock signal synchronized with a touch-sensitive device (1705). Additionally or alternatively, the upcoming scan be predicted based on a scan plan received from a touch-sensitive device (1710). The stylus clock signal can be synchronized with the touch-sensitive device, for example, via a wireless connection. For example, as described herein, the touch-sensitive device can transmit clock information to the stylus. The stylus clock can be re-synchronized (e.g., periodically, during pairing, or in response to interactions with the touch-sensitive device) with the touch-sensitive device to account for drift that can cause mismatch between the stylus clock signal and the touch-sensitive device clock signal. The touch-sensitive device can also transmit scan plan information to the stylus. Based on the stylus clock and/or scan plan information, the stylus can generate stylus stimulation signals at the appropriate time. For example, in some systems, the stylus can generate stimulation signals at regular intervals as determined from the synchronized clock signals. In other examples, the stylus can determine from the scan plan the predicted timing of a stylus scan by the touch-sensitive device, and generate stimulation signals based timing of the stylus can using the clock signal.

In response to predicting an upcoming stylus scan, the stylus can begin generating stylus stimulation signals, which can ramp up to a desired peak-to-peak amplitude (1720). As described herein, the stylus stimulation signals can be generated manually or automatically by stylus stimulation circuitry 504, which can be controlled by processor 506. In some examples, the stylus can begin generating stimulation signals at the start of the predicted stylus scan. In other examples, the stylus can begin generating stimulation signals during a guard band period before the predicted stylus scan (1725). For example, the stylus can begin generating stimulation signals and ramping up at the start of the guard band period, alternatively at some point during the guard band period. Additionally or alternatively, the stylus stimulation signal can achieve the desired full peak-to-peak amplitude during the guard band period or at the conclusion of the guard band period.

The stylus can predict the end of the stylus scan (1730). The end of the stylus scan can be predicted based on the stylus clock signal synchronized with a touch-sensitive device (1735). Additionally or alternatively, the end of the stylus scan can be predicted based on a scan plan received from a touch-sensitive device (1740). In response to predicting an end of the stylus scan, the stylus can stop generating stylus stimulation signals (1750). The stylus can stop generating stylus stimulation signals by manually or automatically ramping down from the desired full peak-to-peak amplitude to an initial amplitude (e.g., zero). As discussed herein, the stylus can begin ramping down the stimulation signals at the end of the stylus scan or during the guard band period following the stylus scan (1755). Additionally or alternatively, the stylus can complete ramping down the stylus stimulation signal during or at the end of the guard band period.

As discussed herein, in some examples, the noise coupling from the active stylus to the touch sensing system can be mitigated by shaping the stimulation signal (i.e., ramping up and/or ramping down). In other examples, the noise can be mitigated by beginning stimulation and ending stimulation during guard band periods. In some examples, the noise can be mitigated by both shaping the stimulation signal and by beginning stimulation and ending stimulation during the guard band periods. In yet other examples, the system can dynamically adjust the application of noise mitigation schemes. For example, the touch sensing system can provide, during a first mode, sufficient guard band to mitigate noise provided by various active styli without shaping the stylus stimulation signal (or with a signal shaping using first parameters). In a second mode, the stylus stimulation signal can be ramped up and/or down (or signal shaping can be performed using second parameters), and the guard band periods can be reduced in duration.

Therefore, according to the above, some examples of the disclosure are directed to an input device (e.g., an active stylus) comprising one or more electrodes, stimulation circuitry coupled to the one or more electrodes and configured to generate one or more stimulation signals; and a processor coupled to the stimulation circuitry and capable of causing the stimulation circuitry to generate the stimulation signals and to ramp up or ramp down an amplitude of the stimulation signals. Additionally or alternatively to one or more of the examples disclosed above, in some examples, the input device can further comprise a force sensor coupled to the processor. The processor can be further capable of causing the stimulation circuitry to generate the stimulation signals and to ramp up or ramp down the amplitude of the stimulation signals based on a force detected by the force sensor. Additionally or alternatively to one or more of the examples disclosed above, in some examples, the processor can be further capable of causing the stimulation circuitry to ramp up the amplitude of the stimulation signals when the force detected by the force sensor meets or exceeds a first threshold and causing the stimulation circuitry to ramp down the amplitude of the stimulation signals when the force detected by the force sensor falls below a second threshold. Additionally or alternatively to one or more of the examples disclosed above, in some examples, the processor can be further capable of causing the stimulation circuitry to ramp up the amplitude of the stimulation signals when the force detected by the force sensor meets or exceeds a first threshold and causing the stimulation circuitry to stop generating the stimulation signals a threshold period of time after the force detected by the force sensor falls below a second threshold. Additionally or alternatively to one or more of the examples disclosed above, in some examples, the processor can be further capable of causing the stimulation circuitry to generate the stimulation signals and to ramp up or ramp down the amplitude of the stimulation signals based on one or more of a synchronized clock and a scan plan. Additionally or alternatively to one or more of the examples disclosed above, in some examples, ramping up or ramping down the amplitude of the stimulation signal can begin during a guard band period before a start of or an end of a scan for the active stylus by a touch-sensitive device. Additionally or alternatively to one or more of the examples disclosed above, in some examples, the processor can be further capable of communicating one or more of an amplitude parameter and a timing parameter to the stimulation circuitry. The stimulation circuitry can be configured to ramp up or ramp down the amplitude of the stimulation signals based on the one or more of the amplitude parameter and the timing parameter. Additionally or alternatively to one or more of the examples disclosed above, in some examples, the processor can be further capable of communicating a plurality of amplitude parameters to the stimulation circuitry. The stimulation circuitry can be configured to ramp up or ramp down the amplitude based on the plurality of amplitude parameters.

Other examples of the disclosure are directed to a method of mitigating noise from a stylus that can be executed by one or more processing circuits, for example. The method can comprise detecting a first event, the first event associated with generation of one or more stimulation signals by the stylus, and in response to detecting the first event, ramping up an amplitude of the stimulation signals until a desired amplitude is reached. Additionally or alternatively to one or more of the examples disclosed above, the method can further comprise detecting a second event, the second event associated with cessation of the generation of the stimulation signals by the stylus, and in response to detecting the second event, ramping down the amplitude of the stimulation signals. Additionally or alternatively to one or more of the examples disclosed above, detecting the first event can comprise detecting a contact between the stylus and a surface. Additionally or alternatively to one or more of the examples disclosed above, the stylus can comprise a force sensor and detecting the contact between the stylus and the surface can comprise detecting a force measured by the force sensor meets a threshold amount of force. Additionally or alternatively to one or more of the examples disclosed above, detecting the second event can comprise detecting a break in contact between the stylus and a surface. Additionally or alternatively to one or more of the examples disclosed above, the stylus can comprise a force sensor and detecting the break in the contact between the stylus and the surface can comprise detecting a force measured by the force sensor fails to meet a threshold amount of force. Additionally or alternatively to one or more of the examples disclosed above, detecting the first event can comprise predicting a start of a scan for an active stylus by a touch-sensing device based on at least one of clock signal synchronized with the touch-sensing device and a scan plan transmitted to the stylus from the touch-sensing device. Additionally or alternatively to one or more of the examples disclosed above, ramping up the amplitude of the stimulation signals can begin during a guard band period before the start of the scan for the active stylus. Additionally or alternatively to one or more of the examples disclosed above, detecting the second event can comprise predicting an end of a scan for an active stylus by a touch-sensing device based on at least one of a clock signal synchronized with the touch-sensing device and a scan plan transmitted to the stylus from the touch-sensing device. Additionally or alternatively to one or more of the examples disclosed above, ramping up the amplitude of the stimulation signals can be based one or more of an amplitude parameter and a timing parameter. Additionally or alternatively to one or more of the examples disclosed above, the method can further comprise detecting a second event, the second event associated with cessation of generation of the stimulation signals by the stylus, and in response to detecting the second event, continuing generating the stimulation signals for a threshold period of time without ramping down the amplitude of the stimulation signals before stopping generating the stimulation signals.

Some examples of the disclosure are directed to a non-transitory computer readable storage medium. The computer readable medium can contain instructions that, when executed by a processor, can cause the processor to detect a first event, the first event associated with generation of the stimulation signals by the stylus, in response to detecting the first event, ramp up an amplitude of the stimulation signals until a desired amplitude is reached. Additionally or alternatively to one or more of the examples disclosed above, the computer reasonable storage medium can contain instructions that, when executed by the processor, can cause the processor to detect a second event, the second event associated with cessation of generation of the stimulation signals by the stylus, and in response to detecting the second event, ramp down the amplitude of the stimulation signals. Additionally or alternatively to one or more of the examples disclosed above, detecting the first event can comprise detecting a contact between the stylus and a surface. Additionally or alternatively to one or more of the examples disclosed above, detecting the second event can comprise detecting a break in contact between the stylus and the surface. Additionally or alternatively to one or more of the examples disclosed above, the stylus can comprise a force sensor. Detecting the contact between the stylus and the surface can comprise detecting a force measured by the force sensor meets a first threshold amount of force. Additionally or alternatively to one or more of the examples disclosed above, detecting the break in the contact between the stylus and the surface can comprise detecting the force measured by the force sensor falls below a second threshold amount of force. Additionally or alternatively to one or more of the examples disclosed above, detecting the first event can comprise predicting a start of a scan for an active stylus by a touch-sensing device based on one or more of a clock signal synchronized with the touch-sensing device and a scan plan transmitted to the stylus from the touch-sensing device. Detecting the second event can comprise predicting an end of the scan for the active stylus by the touch-sensing device based on the one or more of the clock signal synchronized with the touch-sensing device and the scan plan transmitted to the stylus from the touch-sensing device. Additionally or alternatively to one or more of the examples disclosed above, ramping up or ramping down the amplitude of the stimulation signals can begin during guard band periods before the start of the scan for the active stylus or after the end of the scan for the active stylus. Additionally or alternatively to one or more of the examples disclosed above, ramping up or ramping down the amplitude of the stimulation signals can be based one or more of an amplitude parameter and a timing parameter.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method of mitigating noise from a stylus, the method comprising:

predicting, at the stylus, a start of a scan for an active stylus by a touch-sensing device based on a clock signal synchronized with the touch-sensing device and a scan plan transmitted to the stylus from the touch-sensing device;

in response to predicting the start of the scan for the active stylus by the touch-sensing device, at the start of the scan, ramping up a peak-to-peak amplitude of stimulation signals generated by the stylus until a predetermined peak-to-peak amplitude is reached;

predicting, at the stylus, an end of the scan for the active stylus by the touch-sensing device based on at least one of the clock signal synchronized with the touch-sensing device and the scan plan transmitted to the stylus from the touch-sensing device;

in response to predicting the end of the scan for the active stylus by the touch-sensing device, at the end of the scan, ramping down the peak-to-peak amplitude of the stimulation signals before stopping generating the stimulation signals.

2. The method of claim 1, wherein ramping up the peak-to-peak amplitude of the stimulation signals begins during a guard band period before the start of the scan for the active stylus.

3. The method of claim 1, wherein ramping up the peak-to-peak amplitude of the stimulation signals is based on an amplitude parameter and the timing parameter.

4. An active stylus comprising:
one or more electrodes;
stimulation circuitry coupled to the one or more electrodes and configured to generate stimulation signals;
a force sensor; and
a processor coupled to the stimulation circuitry and the force sensor and programmed to:
  communicate a timing parameter to the stimulation circuitry;
  predict a start of a scan for the active stylus by a touch-sensing device based on a clock signal synchronized with the touch-sensing device and a scan plan transmitted to the stylus from the touch-sensing device;
  predict an end of the scan for the active stylus by the touch-sensing device based on at least one of the clock signal synchronized with the touch-sensing device and the scan plan transmitted to the stylus from the touch-sensing device; and
  cause the stimulation circuitry to generate the stimulation signals at a pre-defined peak-to-peak amplitude and to ramp up a peak-to-peak amplitude of the stimulation signals to the pre-defined peak-to-peak amplitude or ramp down the peak-to-peak amplitude of the stimulation signals from the pre-defined peak-to-peak amplitude based on the timing parameter and based on a force detected by the force sensor or the predicted start and end of the scan for the active stylus, wherein the stimulation circuitry ramps up the peak-to-peak amplitude of the stimulation signals at or before the predicted start of the scan for the active stylus by the touch-sensing device and wherein the stimulation circuitry ramps down the peak-to-peak amplitude of the stimulation signals at or after the predicted end of the scan for the active stylus by the touch-sensing device or stops generating the stimulation signals a threshold period of time after the force detected by the force sensor is less than a threshold without ramping down the peak-to-peak amplitude of the stimulation signals.

5. The active stylus of claim 4, wherein ramping up or ramping down the peak-to-peak amplitude of the stimulation signal begins during a guard band period before the start of or the end of a scan for the active stylus by a touch-sensitive device.

6. The active stylus of claim 4, wherein the processor is further programmed to communicate an amplitude parameter to the stimulation circuitry, and wherein the stimulation circuitry is configured to ramp up or ramp down the peak-to-peak amplitude of the stimulation signals based on the amplitude parameter and the timing parameter.

7. The active stylus of claim 4, wherein the processor is further programmed to communicate a plurality of amplitude parameters to the stimulation circuitry, and wherein the stimulation circuitry is configured to ramp up or ramp down the peak-to-peak amplitude based on the plurality of amplitude parameters.

8. A non-transitory computer readable storage medium having stored thereon a set of instructions for generating stimulation signals, that when executed by a processor causes the processor to:
predict, at a stylus, a start of a scan for an active stylus by a touch-sensing device based on a clock signal synchronized with the touch-sensing device and a scan plan transmitted to the stylus from the touch-sensing device, in response to predicting the start of the scan for the active stylus by the touch-sensing device, ramp up a peak-to-peak amplitude of stimulation signals generated by the stylus until a predetermined peak-to-peak amplitude is reached;

predict, at the stylus, an end of the scan for the active stylus by the touch-sensing device based on at least one of the clock signal synchronized with the touch-sensing device and the scan plan transmitted to the stylus from the touch-sensing device; and in response to predicting the end of the scan for the active stylus by the touch-sensing device, at the end of the scan, ramp down the peak-to-peak amplitude of the stimulation signals before stopping generating the stimulation signals.

9. The non-transitory computer readable storage medium of claim 8, wherein ramping up or ramping down the peak-to-peak amplitude of the stimulation signals begins during guard band periods before the start of the scan for the active stylus or after the end of the scan for the active stylus.

10. The non-transitory computer readable storage medium of claim 8, wherein ramping up or ramping down the peak-to-peak amplitude of the stimulation signals is based on an amplitude parameter and the timing parameter.

11. A method comprising:
predicting, at a stylus, a start of a scan for an active stylus by a touch-sensing device based on a clock signal synchronized with the touch-sensing device and a scan plan transmitted to the stylus from the touch-sensing device, in response to predicting the start of the scan for the active stylus by the touch-sensing device, ramping up a peak-to-peak amplitude of stimulation signals generated by the stylus until a predetermined peak-to-peak amplitude is reached;

predicting, at the stylus, an end of the scan for the active stylus by the touch-sensing device based on at least one of the clock signal synchronized with the touch-sensing device and the scan plan transmitted to the stylus from the touch-sensing device; and in response to predicting the end of the scan for the active stylus by the touch-sensing device, at the end of the scan, ramping down the peak-to-peak amplitude of the stimulation signals before stopping generating the stimulation signals.

12. The method of claim 11, wherein ramping up or ramping down the peak-to-peak amplitude of the stimulation signals begins during guard band periods before the start of the scan for the active stylus or after the end of the scan for the active stylus.

13. The method of claim 11, wherein ramping up or ramping down the peak-to-peak amplitude of the stimulation signals is based on an amplitude parameter and the timing parameter.

* * * * *